Dec. 9, 1958   F. A. LYON ET AL   2,863,244
PROTECTIVE MEANS FOR FILM MOUNTS
Filed May 24, 1957

INVENTORS
FLOYD A. LYON
THEODORE ARONSON

United States Patent Office 2,863,244
Patented Dec. 9, 1958

2,863,244

PROTECTIVE MEANS FOR FILM MOUNTS

Floyd A. Lyon, Brookville, and Theodore F. Aronson, Glen Cove, N. Y.

Application May 24, 1957, Serial No. 661,437

5 Claims. (Cl. 40—158)

This invention relates to means and methods of making film mounts such as slide mounts and more particularly to such means providing integral film protection, uniform dimensions, uniform placing of film slides in a predetermined film plane, easy handling by automatic apparatus, and the keeping of film from buckling due to heat.

Prior film or slide mounts for use in projectors, microfilm readers, and other viewing apparatus have generally been made of a cardboard, metal, or plastic frame into which a slide is manually inserted.

One of the major difficulties with conventional slide mounts is that the projector generally must be refocussed during viewing or between slides for accurate viewing. This is a tedious operation which detracts from the viewing enjoyment and from the efficient use of the slides. This condition is generally caused by buckling of the film caused by expansion due to the heat of the projector lamp.

In conventional still projection, film is mounted in binders or mounts for projection. When film is held only by a paper mount, the film can crawl, warp and buckle under the heat of the projection lamp, and cannot be maintained in a flat state or in a film plane for proper projection. The film is also subject to abrasion, scratching and deterioration. In X-rays, cut film, microfilm and other film records, the film must be placed on a flat surface, that is, an illuminated inclined glass plate or flat table and then stretched and straightened out and held in place by clamps. Film tends to roll and curl, and a flat plane for viewing is unobtainable. With the method herein described, X-rays and film records of any size can be viewed at any time and under any conditions. With the present process, such records can be hand held in front of a light source by merely placing the film on any illuminated surface without the need to stretch, straighten out the film, use clips, etc.

Another difficulty with conventional slide mounts is that due to the use of modern automatic, semi-automatic, and manual projection apparatus wherein the slide mounts are mechanically handled by pusher members, fingers, or clips, there is considerable wear on certain portions of the mount which come in contact with the mechanical handling means. Conventional mounts such as cardboard tend to bend, split, and wear at the corners, which makes them difficult to handle mechanically and gives rise to jamming and other malfunction of the handling apparatus. Small pieces of microfilm, for instance an item of interest on a newspaper page, may be easily handled with the present mount.

Therefore, there is a need for precision methods and means for mounting film or slides whereby the film is completely sealed and accurately and permanently placed in the mount.

The present invention resolves these problems by fabricating the mount by sandwiching the film mount between two outer layers of clear plastic which have been indented one or more times, for instance in a spherical, pyramid or cup shape so that the film is in contact with the indented plastic at the center or at uniformly spaced points. The reason for the cup or other indentation shape is that it resists the buckling force of the film a great deal more than a flat area of plastic could. The edges of the plastic are then sealed together or to the mount either with an adhesive or by actually molding the plastic edges together in the mold. The indented portions have a spring effect which accurately locates and holds the film plane in the mount and prevents buckling.

The method of the present invention may be performed by heat sealing with a light, simple, inexpensive, hand press and a heated mold by using a thermosetting adhesive and applying a few pounds of pressure for less than a second. Costly presses having tons of pressure are not required.

This results in a solid, plastic mount which completely seals the film, thereby affording excellent permanent protection. It also accurately spaces the film with respect to the mount so as to eliminate the refocussing problem. Since the mount is made with precision apparatus, the dimensions and thickness will be uniform so that the mounts will be accurately handled by mechanical handling apparatus.

Another advantage of the present invention is that titles or other identifying information may be molded integrally with the mount, or a roughed space may be provided for writing in information.

Another advantage of the present invention is that the mounting is a unitary sealed casing which effectively protects the film surface from scratching, abrasion, and drying out and which also protects the film from the heat of the projector lamp during projection.

Another feature of the present invention is that the film slide mount means may be notched or have holes cut along the edges so that numbers of slides may be automatically classified or sorted by automatic machines of the type now handling punched cards. With automatic sorting machines, such operation would be quite simple with the present invention.

Another feature of the present invention is that it provides a universal mounting means for all different size film. No matter how small the film, it may still be molded into a uniformly dimensioned mount.

Another advantage of the present invention is that there will be no optical distortion of any type due to air spaces, unevenness, or inability to hold the film flat and at an exact right angle to the projection axis.

Another feature of the present invention is that parts of the film may be molded together in groups in a desired sequence. For instance, sets of dental X-rays may be grouped in proper order. Groups may even be overlaid on each other and molded together in the mount to form one picture. This would be a useful technique in mapping or aerial surveying or photography.

Accordingly, a principal object of the invention is to provide new and improved film or slide mounting means.

Another object of the invention is to provide new and improved methods of making film or slide mounting means.

Another object of the invention is to provide new and improved precision film or slide mounting means wherein the spacing of the film is precisely and uniformly maintained so as to eliminate the necessity for refocussing between slides.

Another object of the invention is to provide new and improved slide mounting means adapted to hold film perfectly flat when handling and eliminate distortion due to buckling and unevenness.

Another object of the invention is to provide integral slide mounting means wherein the film is hermetically sealed and permanently preserved and protected.

Another objects of the invention is to provide new and improved slide mounting means which provide heat protection for the film during projection.

Another object of the invention is to provide new and improved mounting means for small X-rays, such as dental X-rays, singly or in groups.

Another object of the invention is to provide new and improved mounting means for small microfilm pieces, for instance, individual pages of a book, magazine, or newspaper, thereby providing easy automatic classification and sorting for cataloging purposes.

These and other objects of the invention will be apparent from the following specification and drawings, of which:

Figure 1:
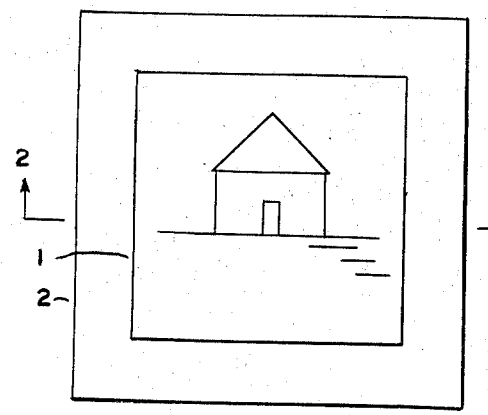
Figure 1 is a plan view of an embodiment of the present invention.
Figure 2:
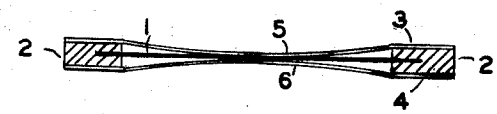
Figure 2 is a sectional view of the embodiment of Figure 1 taken along the lines 2—2 and at a right angle thereto.

Referring to Figures 1 and 2, there is shown a slide mount according to the present invention comprising a film 1 which is mounted in a conventional cardboard mount 2. A pair of clear plastic sheets 3 and 4 are sealed to the cardboard or paper mount 2 preferably with a thermal setting adhesive. The plastic sheets 3 and 4 have previously been indented so that they have spherical, cup, or pyramid shape indentations 5 and 6 which are chosen so that the plastic sheets come in contact with the film 1 exactly at the center point. Due to the elasticity of the plastic sheets and the spherical indentations thereon, there is a strong spring action by both plastic sheet members against the center point of the film so that the center point of the film is securely supported in the proper film plane. Alternatively, a plurality of indentations uniformly spaced will give even greater supporting strength.

The method of heat sealing the plastic sheets to the film mount is preferably done in a heated mold and may be performed with a light, simple, inexpensive, hand press which may apply a few pounds of pressure for less than a second.

Figure 3:
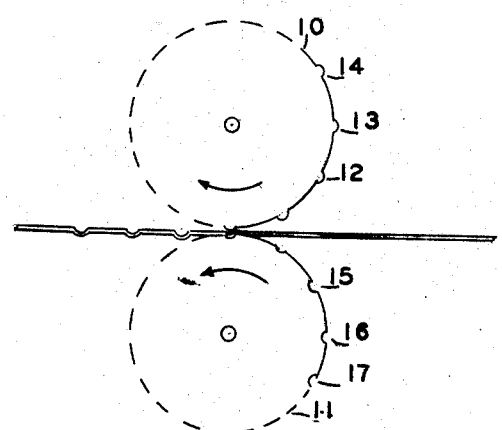
Figure 3 is a schematic view of apparatus for performing part of the process.

The plastic sheets are preferably of methyl methacrylate such as Lucite or other equivalent material. The plastic members may be fabricated by taking strips of the plastic material and inserting the indentations by passing the strip through two rollers 10 and 11, Figure 3, one of which has positive projections 12, 13 and 14 of the proper shape which cooperate with corresponding depressions 15, 16 and 17 of the roller 11 to press in the desired indentations in the plastic strip. After the strip has been indented or dimpled, it is then cut to form the individual members.

Alternatively, pressure sensitive adhesives or other equivalents could be used. If it is desired to mount the plain film, that is, film that has not already been mounted in a paper mount, it would be necessary to mount two rings of filler material such as paper on the film in conventional manner to provide the necessary spacing for the indented portions of the plastic members. Also, the plastic sheets may be chosen to overlap the mount and be sealed to each other. Other reinforcing shapes such as crossed wedges, ribs or the like will occur to those desiring to practice the invention.

We claim:

1. Protective means for film mounts comprising a pair of transparent members attached to said mount around the edges thereof, and means to locate and support said film comprising indented portions of said members in contact with said film.

2. Protective means for film mounts comprising a pair of clear plastic members sealed around said mount on each side thereof, said plastic members being indented in the center thereof and in contact with said film whereby they support the film at the center thereof.

3. Film mounting means comprising a film, a pair of open ring members mounted on either side of said film, a pair of clear plastic members sealed to said ring members, said plastic members having dish shaped indentations in contact with said film at its center point.

4. Protective means for mounting slide film comprising a pair of transparent plate members, means to connect said members to said film adjacent the edges thereof, and means to prevent said film from buckling or warping from a predetermined plane comprising indented portions in said members extending close to said plane.

5. Protective means for mounting slide film comprising a pair of transparent plate members, means to connect said members to said film adjacent the edges thereof, and means to prevent said film from buckling or warping from a predetermined plane comprising at least one indented portion in said members extending close to said plane.

References Cited in the file of this patent
UNITED STATES PATENTS

| 2,268,529 | Stiles | Dec. 30, 1941 |
| 2,432,515 | De Sherbinin | Dec. 16, 1947 |
| 2,490,058 | Jablon | Dec. 6, 1949 |
| 2,496,008 | Jablon | Jan. 31, 1950 |
| 2,572,735 | Kugel | Oct. 23, 1951 |
| 2,659,992 | Kiehl | Nov. 24, 1953 |